(12) United States Patent
Richter et al.

(10) Patent No.: US 10,484,316 B2
(45) Date of Patent: Nov. 19, 2019

(54) SYSTEM AND METHOD FOR CREATING AND SHARING MEDIA PLAYLISTS

(71) Applicant: S Wave Pty Ltd, Frenchs Forest, Sydney (AU)

(72) Inventors: Karl William Richter, Sydney (AU); David James Grinton, Sydney (AU); Iain Dooley, Sydney (AU); Campbell McGuiness, Sydney (AU)

(73) Assignee: S Wave Pty Ltd, Hawthorn (AU)

( * ) Notice: Subject to any disclaimer, the term of this patent is extended or adjusted under 35 U.S.C. 154(b) by 334 days.

(21) Appl. No.: 15/304,312

(22) PCT Filed: Apr. 17, 2015

(86) PCT No.: PCT/AU2015/000229
§ 371 (c)(1),
(2) Date: Oct. 14, 2016

(87) PCT Pub. No.: WO2015/157806
PCT Pub. Date: Oct. 22, 2015

(65) Prior Publication Data
US 2017/0041261 A1 Feb. 9, 2017

(30) Foreign Application Priority Data

Apr. 17, 2014 (AU) .............................. 2014901427

(51) Int. Cl.
| | | |
|---|---|---|
| *H04L 12/58* | (2006.01) | |
| *G06F 16/951* | (2019.01) | |
| *G06F 16/438* | (2019.01) | |
| *H04L 29/08* | (2006.01) | |

(52) U.S. Cl.
CPC .......... *H04L 51/08* (2013.01); *G06F 16/4387* (2019.01); *G06F 16/951* (2019.01); *H04L 67/26* (2013.01)

(58) Field of Classification Search
None
See application file for complete search history.

(56) References Cited

U.S. PATENT DOCUMENTS

| | | | | |
|---|---|---|---|---|
| 7,516,078 | B2 * | 4/2009 | Dhawan | H04M 1/7253 379/87 |
| 9,639,607 | B2 * | 5/2017 | Martin | G06F 16/683 |
| 10,235,454 | B1 * | 3/2019 | Lewis | G06F 16/951 |
| 2002/0002039 | A1 * | 1/2002 | Qureshey | G06Q 30/0641 455/344 |
| 2003/0018799 | A1 * | 1/2003 | Eyal | G06F 16/40 709/231 |

(Continued)

*Primary Examiner* — Brian Whipple
(74) *Attorney, Agent, or Firm* — Hovey Williams LLP

(57) ABSTRACT

The invention is directed to a system for facilitating the creation of playlists of media files including a database configured to store a plurality of playlists therein, each playlist including one or more media files, and each playlist and media file being identifiable by one or more identifiers; a search engine being operatively configured to search and locate one or more media files of a selected playlist, wherein the selected playlist can be selected from a list including playlists and media files identified based on the one or more identifiers, and one or more playlists including a selected media file, wherein the selected media file can be selected from a list of media files and playlists identified based on the one or more identifiers.

18 Claims, 18 Drawing Sheets

(56) References Cited

U.S. PATENT DOCUMENTS

| | | | |
|---|---|---|---|
| 2003/0186645 A1* | 10/2003 | Mori | H04H 60/40 |
| | | | 455/3.01 |
| 2006/0143236 A1* | 6/2006 | Wu | G11B 27/034 |
| 2006/0195462 A1* | 8/2006 | Rogers | G06F 21/10 |
| 2006/0242106 A1* | 10/2006 | Bank | H04L 67/02 |
| 2006/0270395 A1* | 11/2006 | Dhawan | H04M 1/7253 |
| | | | 455/418 |
| 2007/0156697 A1* | 7/2007 | Tsarkova | G06F 16/4387 |
| 2007/0239675 A1* | 10/2007 | Ragno | G06F 16/951 |
| 2008/0162668 A1* | 7/2008 | Miller | H04L 65/40 |
| | | | 709/219 |
| 2011/0072105 A1* | 3/2011 | Biderman | H04N 7/17318 |
| | | | 709/217 |
| 2011/0246623 A1* | 10/2011 | Pantos | H04L 65/1083 |
| | | | 709/219 |
| 2011/0320020 A1* | 12/2011 | Price | G06F 16/4387 |
| | | | 700/94 |
| 2012/0109345 A1* | 5/2012 | Gilliland | G06F 16/68 |
| | | | 700/94 |
| 2013/0325609 A1* | 12/2013 | Sokolov | H04L 65/60 |
| | | | 705/14.54 |

\* cited by examiner

TRANSFERS:
```
Pull: Nick: TVC: 2014 - 04 - 01
   17:30:33::Sydney::nick@email.com
finished                                    [ Close ]
```

```
Pull: Hugh: TVC: 2014 - 04 - 01
   17:08:30::Melbourbe::hugh@email.com.au
pending                                     [ Cancel ]
```

MODE: [ Push | Pull ]

PROXY NODE: [ Master Node ]

FILTER: ( )

DATE RANGE: ( ) ( )

PLAYLISTS:

| Author | Name | Date | ▼ Proxy | Email | ▼ |
|---|---|---|---|---|---|
| Hugh | Example 1 | 2014-04-01 18:08:54 | Melbourne | hugh@email.com.au | |
| Nick | Example 2 1.4.14 | 2014-04-01 17:44:18 | Sydney | nick@email.com | |
| Nick | Example 3 | 2014-04-01 17:30:33 | Sydney | nick@email.com | ▼ |
| Hugh | Example 4 | 2014-04-01 17:08:80 | Melbourne | hugh@email.com.au | |
| CLIENT | Example 5 | 2014- | Master | tracy@email.com.au | ▼ |

[ Refresh ]  [ Pull ]  [ Exit ]

SYSTEM AND METHOD FOR CREATING AND SHARING MEDIA PLAYLISTS

FIELD OF INVENTION

The present invention relates generally to a system and method for facilitating the creation and sharing of electronic media playlists, and in particular, to a system and method for facilitating the creation, sharing and review of digital audio and video media files in a commercial environment.

BACKGROUND OF THE INVENTION

Traditionally, access to music and video was through the purchase of albums, compact discs, video cassettes and the like. In order to establish a music or video library, the purchaser generally established their own catalogue or registry of music/video material accumulated over time which could be used to create playlists and the like through simple recording systems.

In recent times, music and video distribution over the Internet has become increasingly popular due largely to advances in efficient electronic file formats which make media files small enough to be downloaded over the Internet practical. With the speed of Internet connections also increasing, downloading media files, such as music and videos, over the Internet has become commonplace. Such files are able to be stored in digital music players, computer music software or burned to storage formats such as CD or DVD writable disks, non volatile memory cards and the like.

With the increased popularity of downloadable media files, a variety of software applications have been developed to assist users in downloading, playing and organising their media files. Perhaps one of the most popular applications available for this purpose is that referred to as iTunes®, which is a media player and media library application developed by Apple, Inc. The iTunes® application is able to be downloaded to personal electronic devices such as digital music players, tablets, phones, laptops and personal computers and is used to play, download and organise digital audio and video files in accordance with a user's preferences. This can include the ability for individuals to create playlists of their files based on any number of criteria and to share these playlists with other users over a network.

While the increased availability and accessibility of electronic media files has been an important development for the personal enjoyment of such media, significant advantages have also been achieved in commercial environments, which utilise available media for such purposes as advertising and movie and television soundtracks and scores. Traditionally, the accessibility and awareness of new artists has been limited somewhat by the traditional media recording systems, where the availability of new music and new artists has relied upon the ability of those artists to release their music in a traditional album of CD form where it may be heard and used.

For music companies that provide and source music and video for use by advertising agencies or film and television production studios, the ability to download media files that can be readily sampled, classified and stored for future use, provides an efficient means for individuals working in the industry to service their clients. Such accessibility to the media files also enables such companies to readily expand their awareness of new artists and media, which enables them to provide greater options to their clients to suit their needs and requirements.

In such commercial environments, a music company may receive a briefing from a client, such as an advertising agency, to source a piece of music or video that may be suitable for use in an advertisement or as background music. The client may provide some indication of the type of music/video they require and rely upon the company providing them with a variety of suitable options from which to choose. The music company may search their database of relevant files and typically rely upon the expertise of their staff to identify and collate the various media files for transmission to the client via an email or a dedicated file-sharing medium, depending upon the size of the individual files. The client can then review each file and determine whether any of those files are suitable to their needs.

It will be appreciated that such a system of searching, collating and transmitting multiple media files can be a time consuming and labour intensive exercise. The success of the task is largely reliant on the expertise and knowledge of the individual performing the task and their knowledge of the existing library of files. Hence, should the individual leave the company the skill and knowledge of that individual is typically lost to the company as well. Further to this, the need to download and upload files is also time consuming depending upon the size of the files and the speed of the network in which the files are being transferred.

Thus, for such applications, there is a need to provide a system and method for facilitating the creation and sharing of electronic media playlists that allows for a degree of collaboration in the creation of the playlists and improves the manner in which the files are transferred within the system.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

SUMMARY OF INVENTION

According to one aspect of the invention, there is provided a system for facilitating the creation of playlists of media files including
  a database configured to store a plurality of playlists therein, each playlist including one or more media files, and each playlist and media file being identifiable by one or more identifiers;
  a search engine being operatively configured to search and locate
    one or more media files of a selected playlist, wherein the selected playlist can be selected from a list including playlists and media files identified based on the one or more identifiers, and
    one or more playlists including a selected media file, wherein the selected media file can be selected from a list of media files and playlists identified based on the one or more identifiers.

Advantageously, the system links previously compiled media files and playlists so that previously created playlists, for example for a particular project or client, can be used as a starting point or to provide inspiration for ongoing projects. Moreover, historical projects for a particular client is retained in the system and can be easily located and used as a reference for new projects, for example, for the same client or a similar project brief, thereby providing a useful tool to capture information relating to client requirements, preferences and styles. By retaining knowledge of previous works, and providing a search engine that allows easy retrieval of relevant information, the system also provides an intuitive and convenient tool for creating new playlists.

Whilst the invention is being described herein with reference to playlists and media files, the concept of the invention can also be used in other industries, and applied to other types of data and files.

The system may include a display module for generating display data to display search results of the search engine, wherein the display module is configured to generate display data for displaying
- a first list of playlists and media files in response to receiving one or more identifiers,
- a second list of playlists in response to a selected media file from the first list, wherein the selected media file forms part of each playlist in the second list, and
- a third list of media files in response to a selected playlist from the second list, wherein the selected playlist includes the third list of media files.

The system may further include a display module for generating display data to display search results of the search engine, wherein the display module is configured to generate display data for displaying
- a first list of playlists and media files in response to receiving one or more identifiers,
- a second list of media files in response to a selected playlist from the first list, wherein the selected playlist includes the second list of media files, and
- a third list of playlists in response to a selected media file from the second list, wherein the selected media file forms part of each playlist in the second list.

The display module may be capable of displaying further lists of media files and playlists based on a selected media file or playlist from an immediately preceding list.

The system may further include a display device for displaying data generated from the display module, wherein the display device displays the first, second and third list respectively from left to right with respect to a user facing a screen of the display device.

Each consecutive list may be visibly displayed on the display device with an immediately preceding list.

The media files may include any one or more of music files, video files and image files.

The system may further include a playlist module for creating a new playlist, wherein the new playlist includes one or more media files and/or playlists located by the search engine.

The system may further include playlist module for creating a new playlist. The new playlist may include one or more media files and/or playlists selected from any one of the lists.

The system may be configured to allow the new playlist to be saved and contents of the media files of the new playlist downloaded for offline access.

The contents of the media files of the new playlist may be shared via email.

The system may further include a playlist transmission module, the playlist transmission module being configured to facilitate transmission of a playlist from a remote user to the server and/or a stored playlist from the server to the user, wherein, prior to transmission of the playlist, the playlist transmission module determines whether a media file is present at the server or remote user and only transmits media files that are not present at the server or remote user.

According to a further aspect of the invention, there is provided a method of creating playlists of media files, including
- searching a database including a plurality of playlists, each playlist including one or more media files, wherein each playlist and media file is identifiable by one or more identifiers;
- in response to a user selected playlist, locating one or more media files of the selected playlist, wherein the selected playlist is selected from a list including playlists and media files identified based on the one or more identifiers, and
- in response to a user selected media file, locating one or more playlists including a selected media file, wherein the selected media file is selected from a list of media files and playlists identified based on the one or more identifiers.

The method further includes creating a new playlist based on the one or more located playlists and/or one or more located media files.

According to another aspect of the invention, there is provided a system for facilitating the creation of playlists of media files including
- a database configured to store a plurality of playlists therein, each playlist including one or more media files, and each playlist and media file being identifiable by one or more identifiers;
- an interface for receiving one or more identifiers,
- a search engine being operatively configured to search and locate a first list of playlists and media files based on the one or more received identifiers, and
- a display module for generating display data for displaying the search list via the interface,
- wherein
  - in response to a user selected playlist from the search list, the search engine is configured to locate a second list of media files, the second list of media files being the media files of the selected playlist, and
  - in response to a user selected media file from the search list, the search engine is configured to locate a third list of playlists, the third list of playlists being playlists including the selected media file.

According to yet another aspect of the invention, there is provided a system for facilitating the creation of playlists of media files comprising:
- a server configured to receive and store a plurality of playlists of media files therein, each playlist and media file being identifiable by one or more identifiers;
- one or more remote devices, each device comprising a processor including executable software capable of generating a playlist made up of one or more media files; and
- a playlist transmission module, the playlist transmission module being configured to interface with the software and the server to facilitate transmission of the generated playlist from said remote device to said server and/or a stored playlist from said server to said remote device, wherein, prior to transmission of said playlist, the playlist transmission module determines whether a media file is present at the server or remote user and only transmits media files that are not present at the server or remote user.

The system may further include a file transfer interface, the interface being configured to allow a user to transfer a selected file between the server and a remote device via a drag and drop user command.

According to yet another aspect of the invention, there is provided a method of sharing files between multiple users across a network comprising:

generating a list of files for review by at least one or more recipient users;

pushing said list of files to said one or more recipient users across said network;

determining whether the said one or more recipient users is in possession of one or more files in said list of files;

pulling from a stored location only those files in the list of files that is not in the possession of said recipient user;

presenting to said recipient user a downloadable said list of files for review; and delivering the files for review by the recipient through the recipient's preferred file playing software.

According to another aspect of the invention, there is provided a method of creating a compilation of files, including searching a database including a plurality of compilations, each compilation including one or more files, wherein each compilation and file is identifiable by one or more identifiers;

in response to a user selected compilation, locating one or more files of the selected compilation, wherein the selected compilation is selected from a list including compilations and files identified based on the one or more identifiers, and in response to a user selected file, locating one or more compilations including the selected file, wherein the selected file is selected from a list of compilations and files identified based on the one or more identifiers.

Any of the features described herein can be combined in any combination with any one or more of the other features described herein within the scope of the invention.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to its application for use in a commercial environment for creating a playlist comprising sets of media files, typically music files, for sharing and review. In this regard, the present invention will be described below in relation to the means by which files are to be shared between users of the system, as well as the means by which playlists can be created utilising the overall functionality of the system. It will be appreciated that the present invention could also be used to facilitate the management and/or sharing of a variety of electronic files other than pure media files, such as data files in the form of word processing documents and or spreadsheets, which can be sorted and linked through usage and access of such files by other users of the present system.

The present invention will also be described below in relation to its ability to integrate with a pre-existing software application, namely iTunes®. However, it will be appreciated that the system and method may be adapted to be used with any variety of existing software applications capable of playing, creating and managing playlists.

The system and method of the present invention enables a network-based media community to access and share media playlists, such as collated audio or video playlists, among members of that community. Based on the role or position of the individual member, each member may have a different level of access to the system and the overall system as will be described in more detail below. The system provides interfaces for accessing playlists and other information, and enables members to search, view, play and collate playlists in accordance to their position or role within the community.

Figure 1:
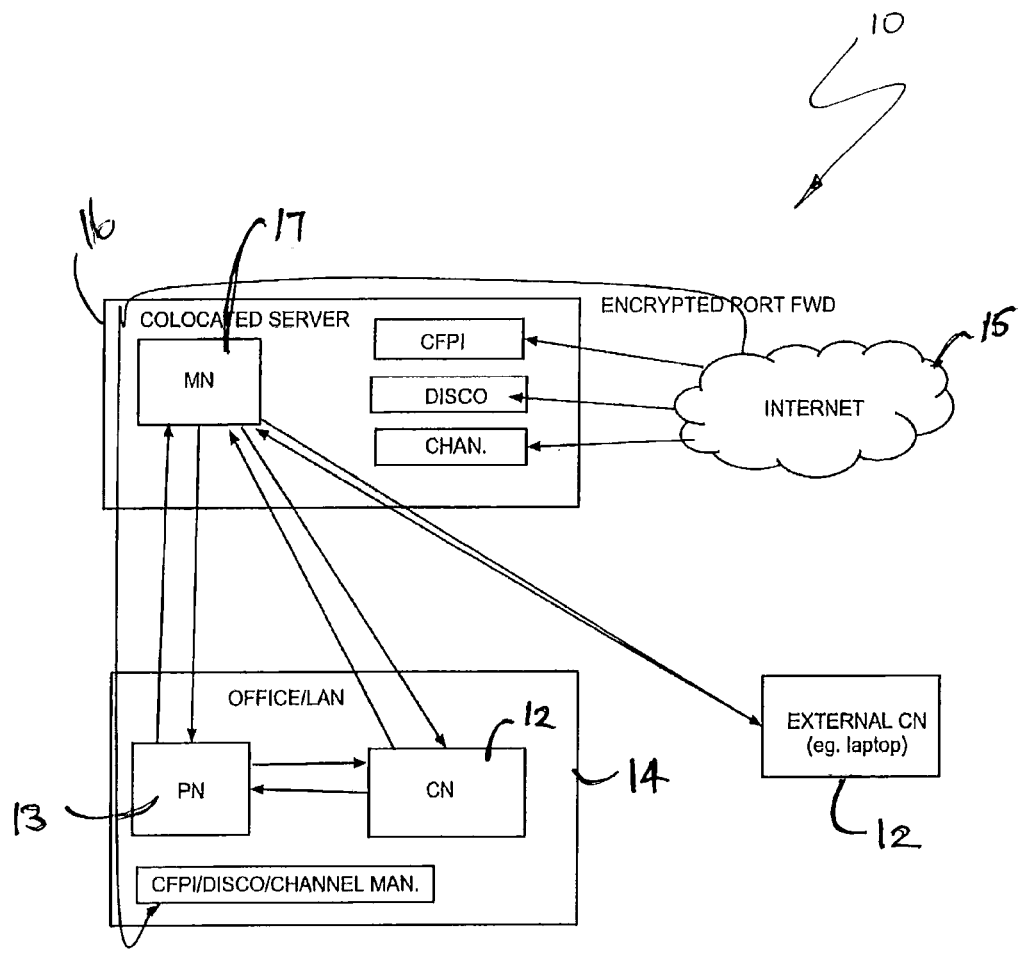
FIG. 1 is a schematic diagram of the system for generating and sharing playlists of media files within a network-based media community.

Referring to FIG. 1, one embodiment of a network based media community in accordance with the present invention is depicted. The system 10 is configured for use between individual users 12 and office users 14, the latter of which may comprise individual users 12 linked via a LAN of similar local network arrangement within the office environment. Each of the individual users 12 and office users 14 communicate with a local data centre (such as a co-located server) 16, which may comprise a centrally located server 17 that serves a dedicated region of users 12, 14.

For individual users 12, the users 12 may use a laptop or PC installed with appropriate software to facilitate communication directly with the local data centre 16, for external users, or for those present in the office 14, to facilitate communication with the office 14 or the local data centre 16. Typically the individual user's laptop/PC/tablet or any other related electronic device may have iTunes® installed thereon to enable each user 12 to generate playlists and play media files in a conventional manner. Therefore the software stored on the user's electronic device enables the system 10 to interface with iTunes® to facilitate transfer of files within the office 14 or to the local data centre 16 to enable playlist sharing. In this regard, the software may employ AppleScript to interface with the iTunes® library stored on the device and may employ a more high-level programming language such as Python, to script all communications between the user 12 and the office server 13 and central server 17 of the data centre 16. For secure data communication between the user 12 and the office server 13 and central server 17 of the data centre 16, a SSH/SCP tunnelling protocol may be employed.

The office 14 typically comprises a server 13 that facilitates two-way communication between the server 13 and each individual user 12 within the office 14. The server 13 may be installed with system software to facilitate communication between the office users 12 and the central server 17 at the local data centre 16. The server 13 may employ a standalone database that is independent of iTunes® to facilitate movement of media files to and from each individual user 12 and the central server 17 of the local data centre 16. The software may employ a SSH/SCP tunnelling protocol for secure data transfer and for making data available to users outside of the office LAN.

The central server 17 of the data centre 16, is structures similarly to the server 13 in each linked office 14 and is configured to regularly synchronise with each connected server 13 to update the server 13 with playlists as they are created. In this regard, the central server 17 employs a high-level programming language, such as Python, to script all communication with the connected servers 13 and remote users 12. A SSH/SCP tunnelling protocol may be employed to facilitate secure movement of media files between each connected server 13 and user 12.

In order to communicate with the servers 13 and central server 17 a variety of interfaces are provided within the software of the system which can be accessed via the internet 15. An interface referred to as the CFPI (Client Facing Playlist Interface) provides a web interface for viewing playlists as well as allowing playlists to be downloaded directly from the server without logging into the system. The Disco (Discovery) interface provides a web interface that enables a user to search tracks and playlists stored in the system and to find related tracks as required. The Channel Manager Interface is also provided as a web interface in the form of an endpoint and sample web based player that allows streaming of media through various channels which can enable a playlist stored on the system to be streamed live as required. The manner in which each of the web interfaces function will be discussed in more detail below.

In some embodiments, one or more virtual private servers may be used to host the system software and to enable cloud based storage of data.

It will be appreciated that a primary objective of the system of the present invention is to provide for collaborative creation and review of music and video playlists that have been created utilising a familiar and pre-existing software application, such as iTunes®.

The system also is directed towards facilitating a web based interface that enables the discovery and re-use of media files through searching tracks and playlists. This is generally achieved by the system structure as depicted in FIG. 1 and which will be described in more detail below.

As previously discussed, each user 12 is able to use the application iTunes® to generate a playlist. A playlist may comprise a series of music racks in the form of music files identified and grouped together by the user 12. The user 12 may be employed by an advertising agency to provide a list of suitable items of music in accordance with a brief, for example the brief may be to locate a piece of music having a melody and genre suitable for use in a Caribbean-type setting, which may be the setting of a specific advertisement. Once the user 12 has received the brief, the user may collate a playlist in accordance with the brief through their iTunes® software.

Each user 12 is provided with a software application on their PC or laptop that enables playlists to be synchronised between their iTunes® application and one or more of the servers 13, 17. This application is referred to as a Push/Pull application and enables the user 12 to "push" playlists created in their iTunes application on their PC/laptop to the servers 13, 17 and to "pull" playlists stored on the servers 13, 17 into their iTunes application on their laptop/PC.

Figure 2:
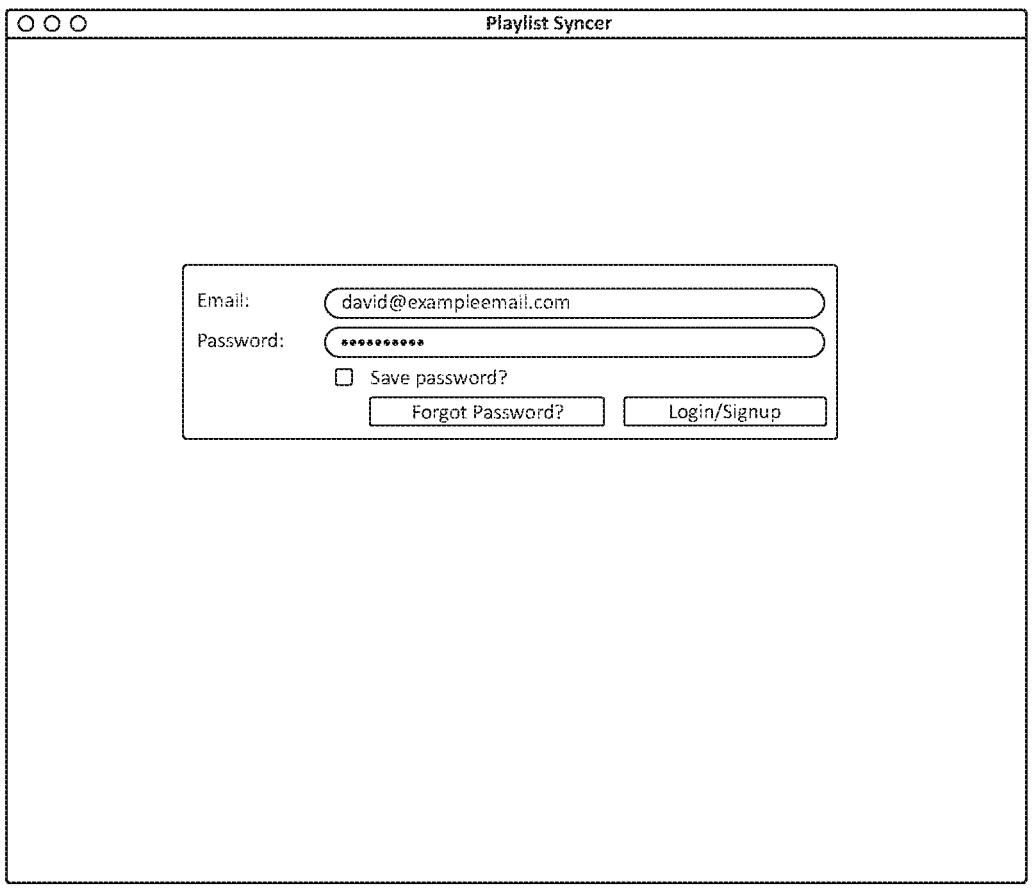
FIGS. 2-4 show screenshots depicting a software application for loading and downloading playlists in accordance with the system of FIG. 1.

In relation to the "push" application, once a playlist has been created for the client in their iTunes application on the user's laptop/PC, the user 12 initiates the Push/Pull application. This is done by the user 12 initiating the login screen as depicted in FIG. 2 where the user 12 enters their account details, typically their email and password as shown.

As previously discussed, the system 10 of the present invention employs multiple servers that each contain a full copy of the music library and playlist information generated by the individual users 12 over time. These servers comprise an office server 13 in instances where the user 12 is in an office environment via a LAN, or the central server 17 of the local data centre 16, where the user is remotely located, away from the office. It will be appreciated that in the system 10 depicted in FIG. 1, the network based media community may comprise any number of office servers 13 which are each connected to a single central server 17, with each office server 13 only connected to one central server 17. It will be appreciate that the structure of the system 10 will be largely reliant on the structure of the company(s) using the system. For example, a company may have their own dedicated central server 17 which each of their regional or satellite offices 14 having their own office server 13 that communicates and synchronises regularly with the central server. In such a situation, remote users 12 may be able to "push" and "pull" files directly from the central server 17. Alternatively, is a company is structured to share a central server 17 and installs their own office server, a remote user 12 cannot "push" and "pull" files directly from the central server 17.

Figure 3:
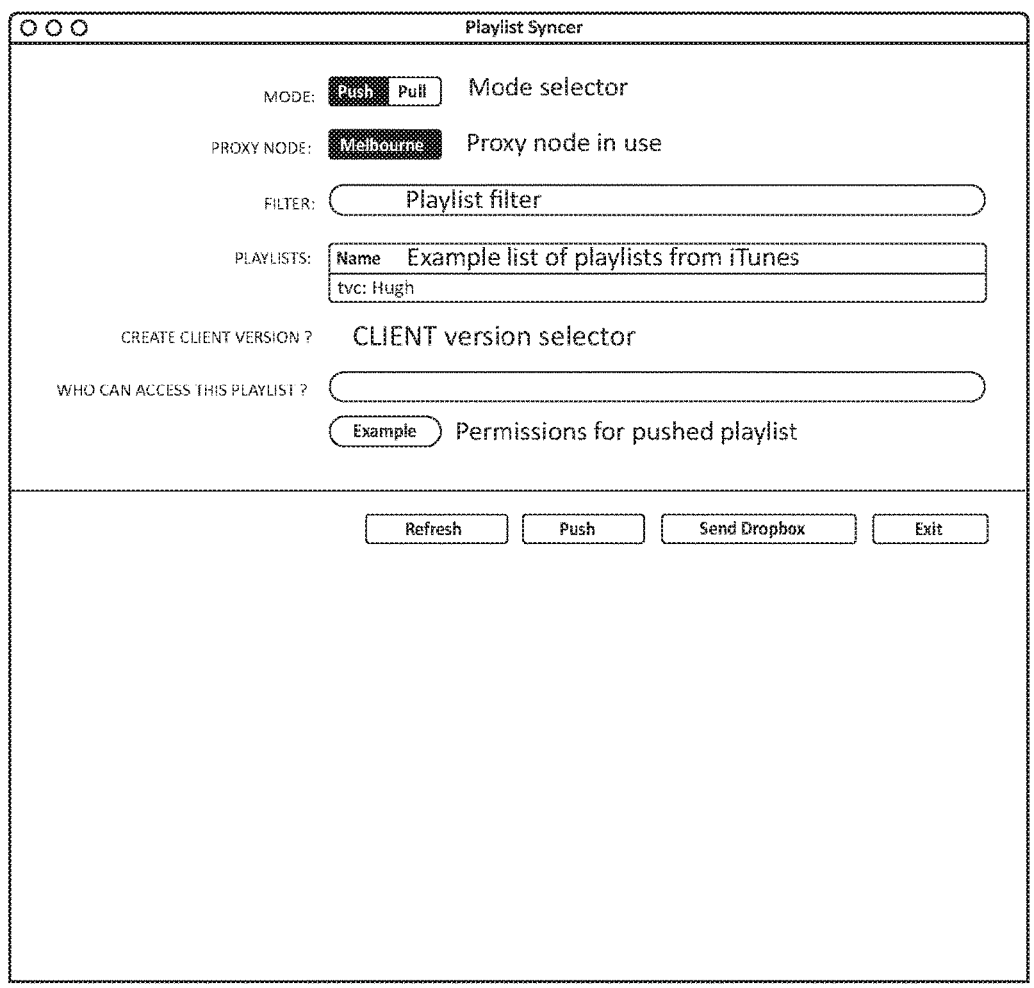

In any event, upon the user 12 logging into the Push/Pull application, the application determines the closest available server and selects this server for transmission of files, as is shown in FIG. 3. In this example, the "MELBOURNE" server is selected. The user 12 is then able to choose the mode of use, namely whether they wish to "push" the playlist files to the server or "pull" playlist files from the server. In the embodiment as shown in this example, the user 12 has decided to "push" their created playlist to their iTunes to the remote server.

In FIG. 3, the user 12 is able to select the playlist from a list of playlists in their iTunes and by selecting the "push" button the transfer of the playlist files begins immediately. Multiple playlists may also be pushed thereby creating a queue for the person selecting and pushing the playlists. The queue created in such a situation will show those playlists selected but not yet pushed as being in a "pending status" and the user is able to toggle between a log of all playlists while choosing more playlists to pull or push. Similarly, if there are other transfers active between the user 12 and the remote server, the transfer may be placed in a queue to be performed at the next available interval.

Depending upon the purpose in which the playlist was created by the user, the user 12 is able to determine whether the created playlist should be classified as a client version or not. By classifying the playlist as a client version, all client versions are listed on the server for downloading when the user 12 is in "pull" mode, rather than merely the most recently created version. If a playlist has been classified as a client version, upon pushing the playlist to the remote server the user 12 is typically provided with additional options, including specifying email addresses to notify the client that the playlist is available to access. In such an instance, the client will be sent a link to a downloaded version of the playlist for the client to assess and review.

As depicted in FIG. 3, upon "pushing" the playlist to the server, the user 12 is able to set permissions to control who is able to access the playlist from the server. Each playlist created and "pushed" will have a set of associated permissions for this purpose, in accordance with the specific requirements of the user 12. Such permissions will typically enable the user 12 to identify permission levels of access or specify individuals or groups that are able to access the playlist. As such, only users with permission to access the playlist will have the playlist displayed in "pull" mode.

It will be appreciated that all playlists pushed to any office server 13 or central server 17 will be synchronised to each other office server 13 linked to the central server 17.

Figure 4:
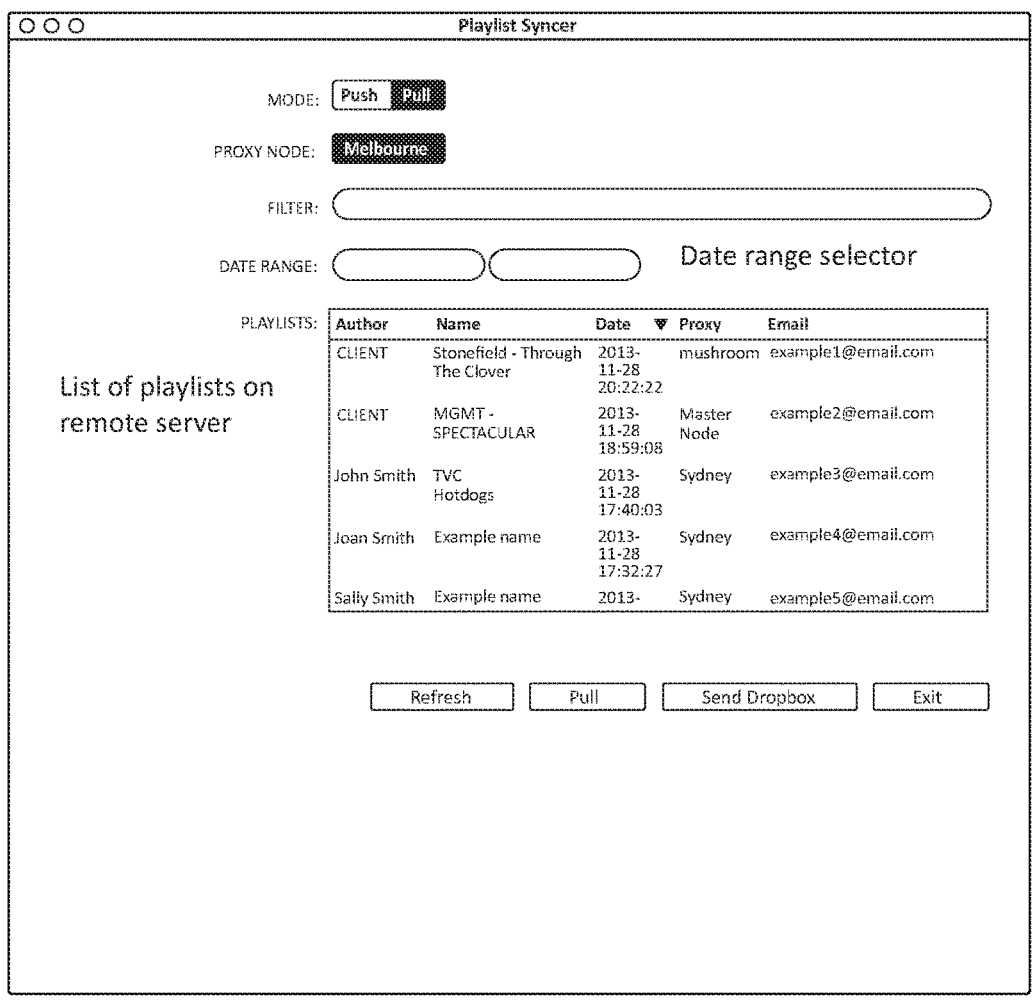

When the application is in "pull" mode, the user 12 selects the "pull" icon as depicted in FIG. 4. The application then locates the closest most relevant server to the user 12 and provides a complete listing of the playlists stored on that server that are available to the user 12 for download. This will be determined by the permission level of the user 12 and any restrictions that may have been placed on the playlist by the creator of that playlist.

Figure 4B:
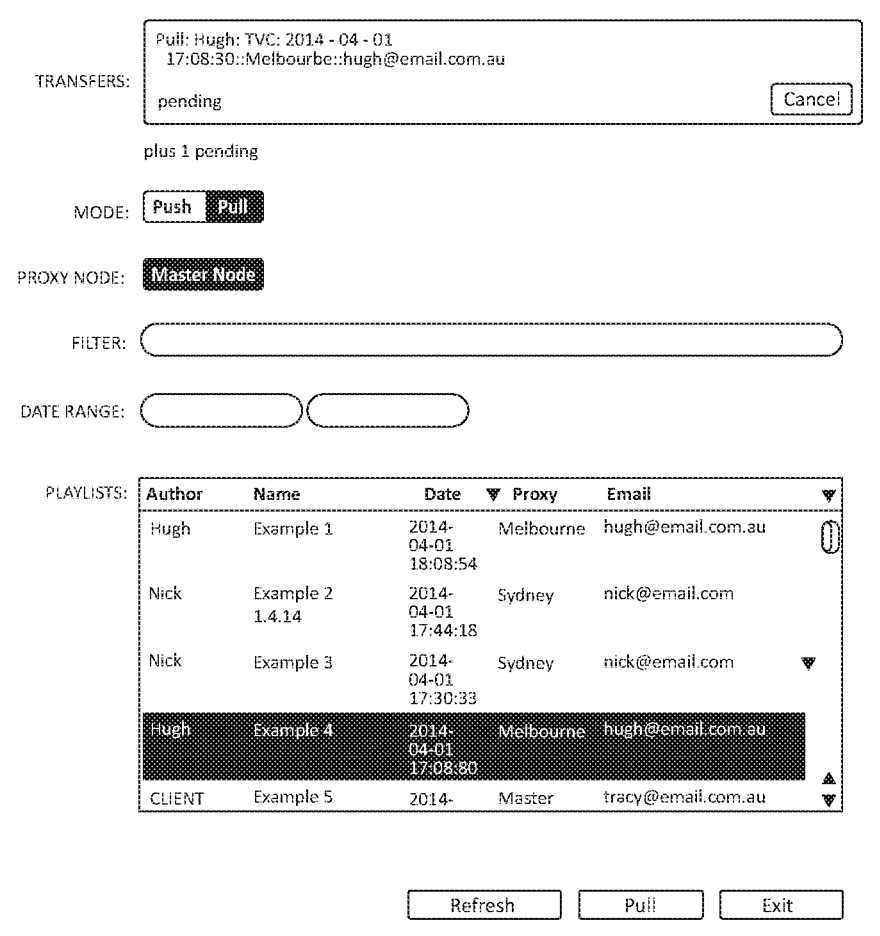

To access the playlist, the user 12 selects the desired playlist from the list displayed and selects the "pull" icon. The playlist is then directly transferred to the user 12 and is created in the user's iTunes application for display and review. Multiple playlists are able to be pulled by the user thereby generating a queue for the user, showing the pull status of the selected playlists (FIG. 4A), with those playlists selected but not yet pulled being shown as having a pending status, and the user will be able to toggle between a log of all playlists while choosing more playlists to pull or push (FIG. 4B).

It will be appreciate that the transfer of media files between the user 12 and the servers 13, 17 could be time consuming, especially if the media files are large. However, when files are pushed/pulled prior to transfer the software performs a check of the storage media at either end, namely the user's iTunes or the server database, to determine if a copy of the file is already stored. This check could be performed based on "track name", "artist" or "album" which is data stored against each individual file. If the software determines that a copy of the file is already available at the destination site, the file is not transferred but a link is made to the already available file when the transfer of the playlist is completed.

Following the completion of the transfer, the system will generate an automatic email to the user that pushed the playlist, confirming that a playlist has been successfully pushed to the intended recipient, with another email being sent to the recipient recording the transaction. Each of the pusher and the recipient will also have the ability to view the playlist(s) pushed/pulled in the body of the email. The lists can also be viewed and individual files can be streamed or downloaded directly from a tab in the body of an email.

The system is configured to be compatible with iTunes® or any other commercially available music downloading and playing system such that the music or files is delivered within such a commercially available interface to work seamlessly with a users preferred music playing environment. When the music files are downloaded, the user is able to sample the files through their preferred media player and there is no need for the user to perform any further transfer of files to convert them across to a new environment or transfer them into a different file format. The system is compatible with commercially available media players and works simply and effectively with those media players to enhance usability and efficiency.

It will be appreciated that the system of the present invention provides a convenient means for managing and accessing playlists generated within a network-based media community for any variety of purposes. Such a system has particular advantage for businesses that may have a number of remote offices and provides a central means for storing and capturing information. The system avoids duplication of files and ensures that information is regularly updated as it is created.

It will be appreciated that by providing a means for storing and managing created playlists in an accessible database, the information contained within the playlists can be used to provide improved collaboration in accordance with client requests. To achieve this, a web based interface has been developed to mine information contained in previously compiled playlists.

As previously discussed, with the advent of new artists releasing music online or through independent means, it is difficult to keep up to date with new artists and recordings. Further, where music companies are briefed by a client to provide music to be used in an advertisement/movie to match a desired mood or setting, it is important to provide the client with a number of options that may best suit their requirements.

In the system of the present invention, upon creation of a playlist, the details of that playlist are stored on the servers of the system as previously discussed. These details typically include the artist responsible for creating each individual track of the playlist as well as any information relation to the album upon which the individual track was taken. The playlist may also be assigned to a client or a title that describes the purpose of the track, which represents a field that may be searched by the "Disco" interface of the present invention.

The "Disco" interface of the present invention is a web based tool for discovering associations between tracks and playlists created and stored in the database system of the present invention. The Disco interface can be used to search an entire library stored on any office server 13 or central server 17. Each user is able to log-in to the Disco interface and at all times the information is automatically saved against the user's profile.

Figure 5:
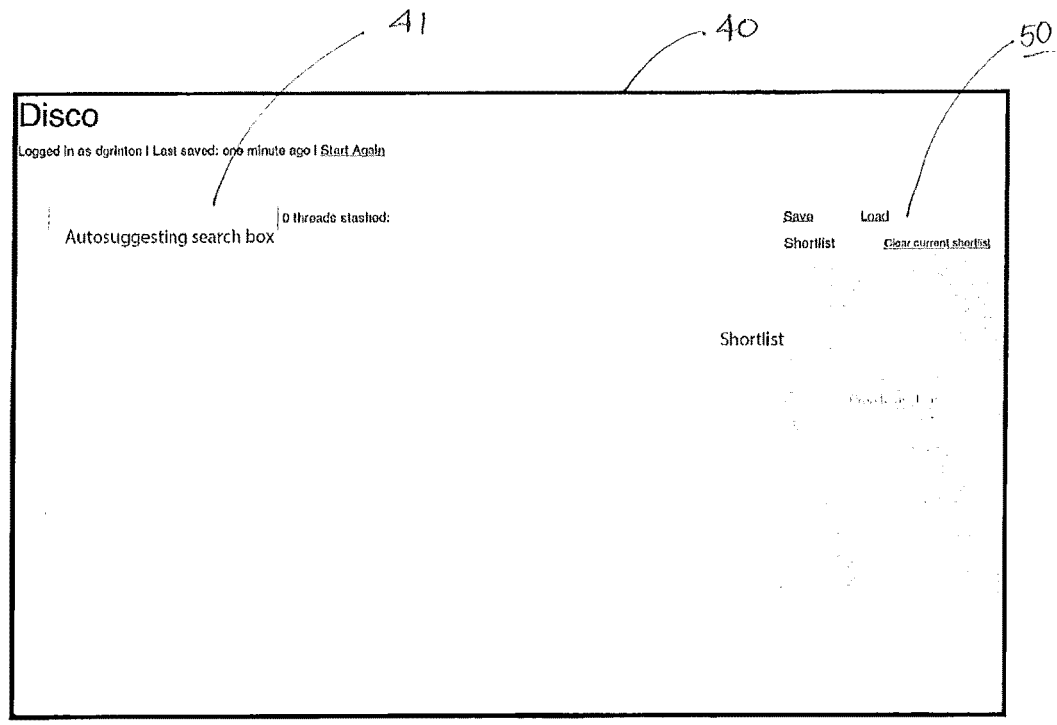
FIGS. 5-14 show screenshots depicting a software application for searching and interrogating saved playlists for generating a new playlist in accordance with an embodiment of the present invention.
Figure 5A:
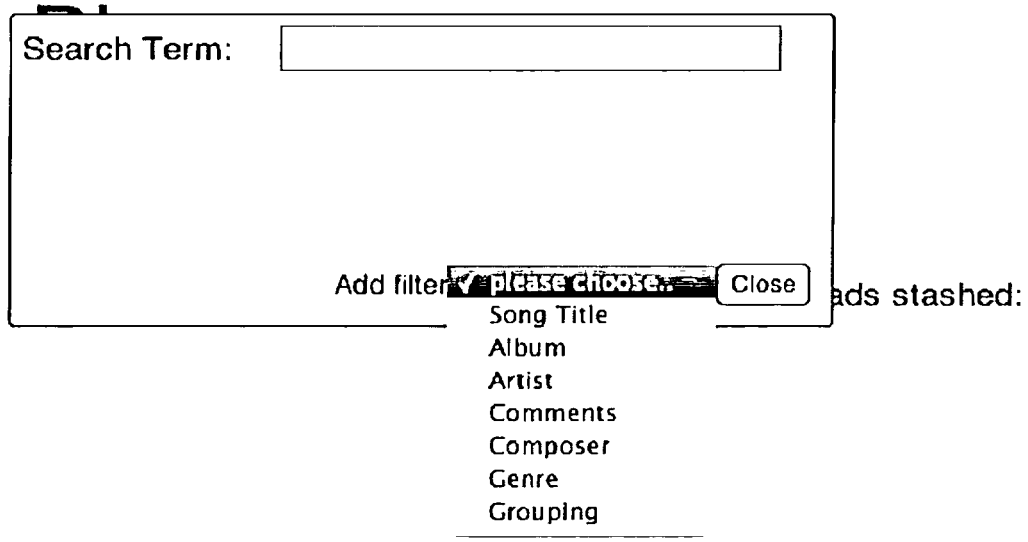

Referring to FIG. 5, upon logging into the Disco interface the user is presented with a "start screen" 40 as depicted. From this screen 40 the user is able to initiate a search of the system database by entering a keyword into the auto suggesting search box 41. This keyword could be related to a client name that may have made a previous request or may include a song title or artist name. The user is able to search across numerous fields (FIG. 5A) to provide a defined search across previous playlists that may have been created.

Figure 6:
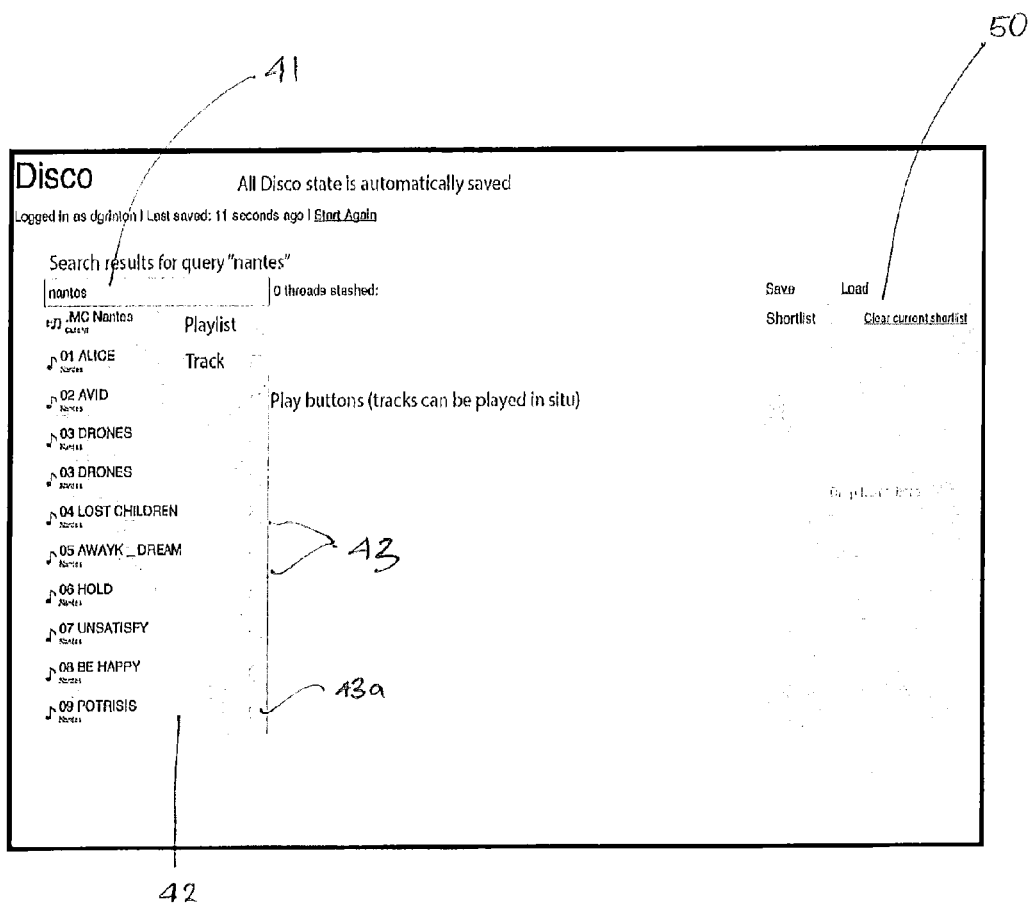

In the specific example depicted in FIG. 6, the user enters the term "NANTES" which equates to an artist name. As a result, the Disco interface initiates a search of the files stored on the most local database and lists all the results that match that query in a related search column 42, as shown. The search column depicted lists all tracks 43 stored in the database associated with the artist 'nantes' together with a playlist titled "MC Nantes". From the listing provided in column 42, the user is able to select a track 43 by selecting the "play" button 43a located alongside the track, which enables the user the option to preview the track 43.

Figure 7:
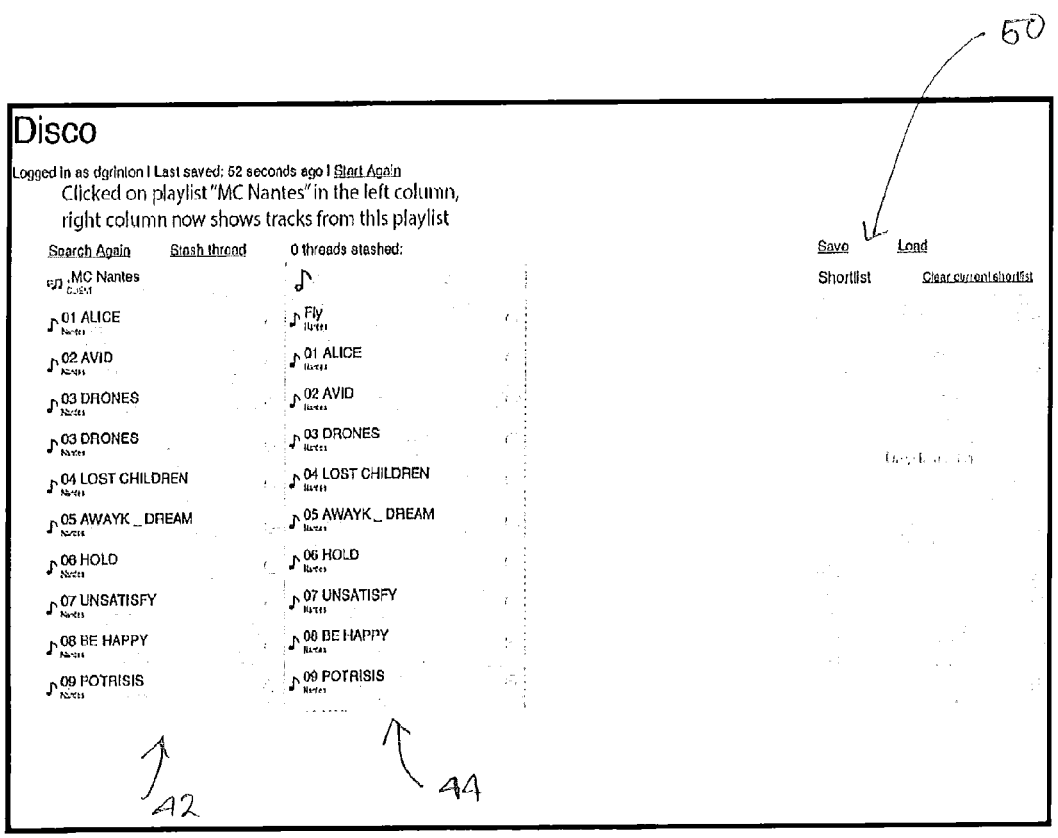

As depicted in FIG. 7, the user is able to select one of the items listed in the column 42. In the example as shown, the user selects the playlist "MC Nantes" which creates a second search column 44 positioned along the first search column 42 that lists all the tracks from the selected playlist. Once again, the user is able to select one or more of the tracks to preview the tracks.

Figure 8:
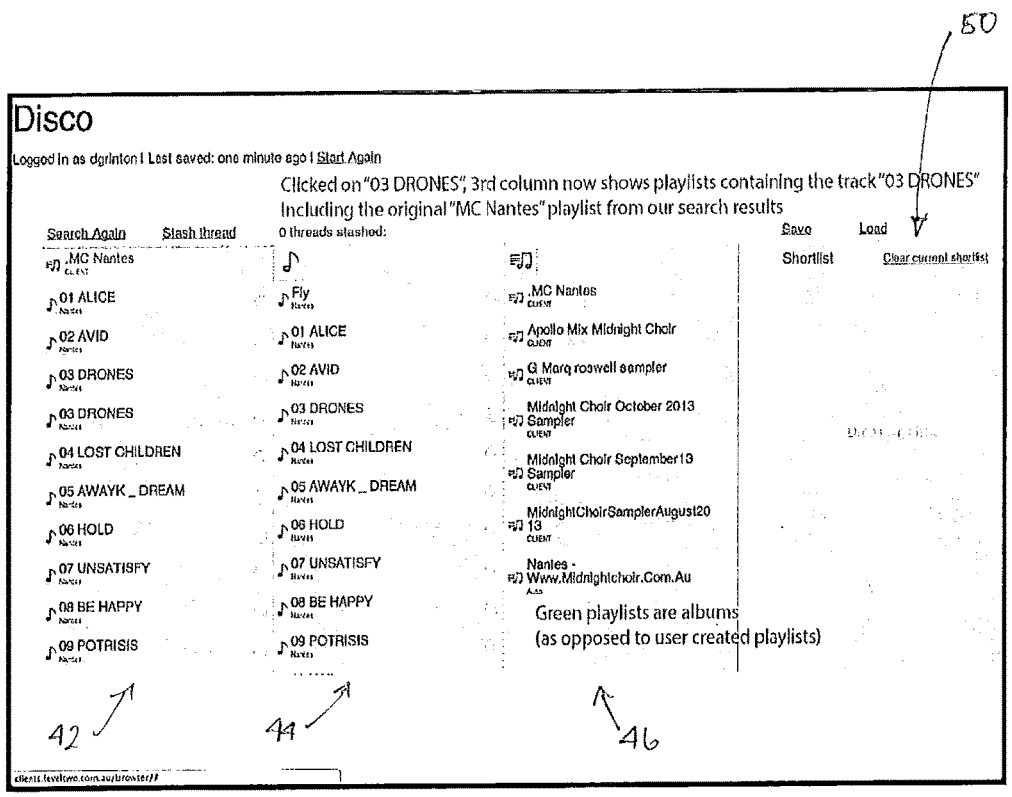

Referring to FIG. 8, should the user select a track from the search column 44, the Disco interface will initiate a search of the database to locate playlists or entries which have included this track. The results of this search are presented in a new search column 46, as shown.

Figure 9:
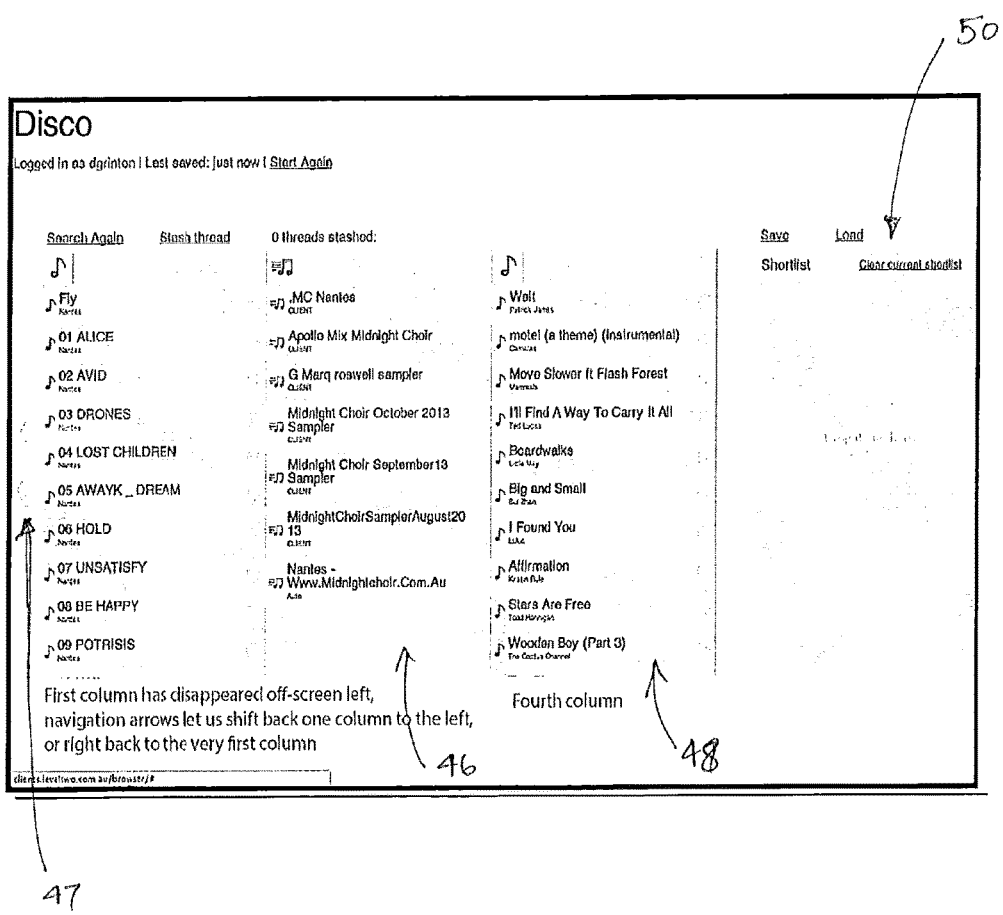

As depicted in FIG. 9, if the user continues to select an entry from column 46, this will initiate a new search of the database to identify any playlists that include the selected entry. The results will then be displayed in column 48. As is shown, each new search column will be presented to the left of the previous search column and the user is able to navigate between columns by using navigation buttons in a conventional manner. Each column represents a thread.

Figure 10:
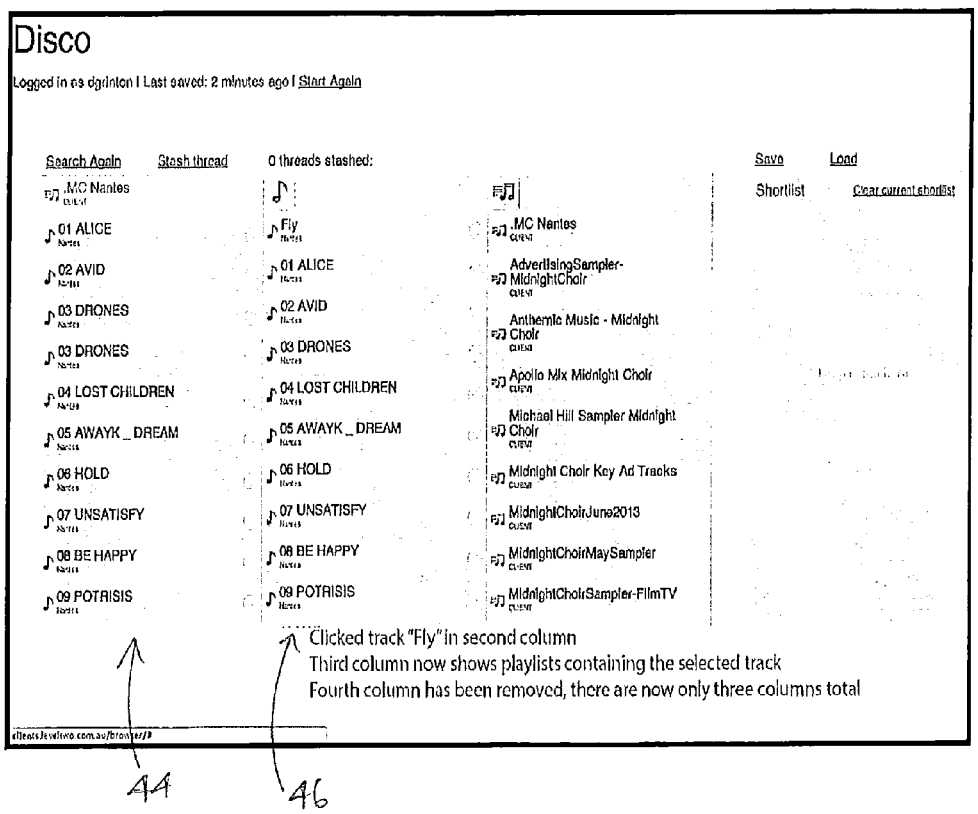

As shown in FIG. 10, should a user wish to select a different track from a search column, the search results for that track will be presented immediately to the left of that column, which may result in the previous column being replaced, creating a new thread.

Figure 11:

It is possible to save threads with the Disco interface by selecting the "stash thread" button 49 of FIG. 11. The threads can then be accessed at a later date if desired.

Figure 12:
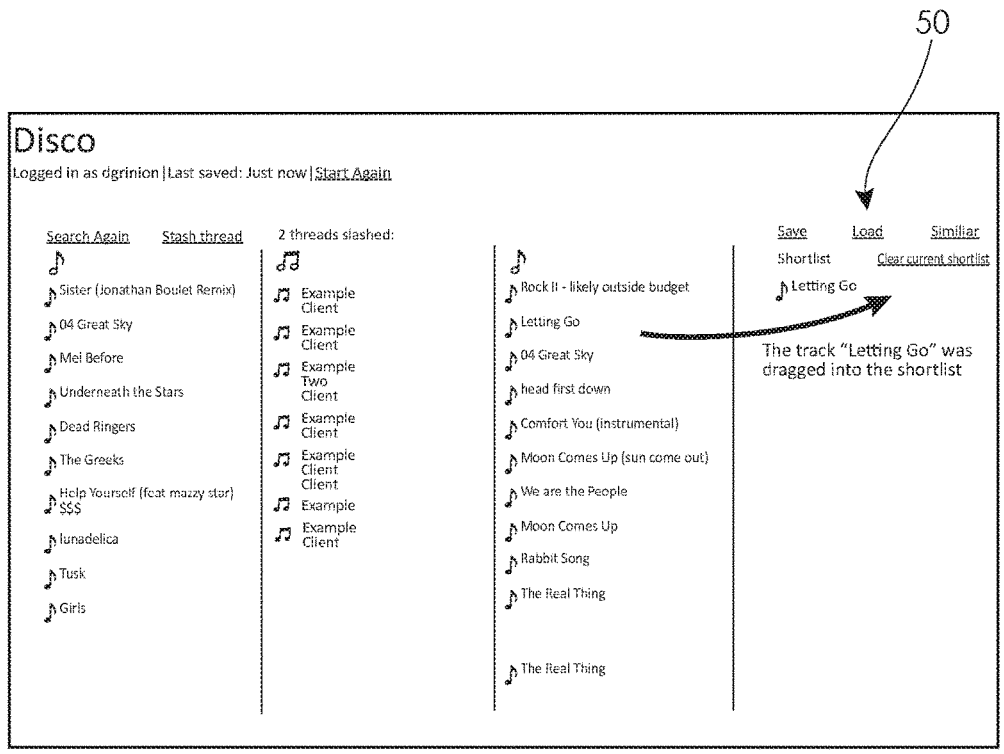

At any time, should the user wish to select a track as a potential track for inclusion in a new playlist, the user is able to select that track and drag that track onto their "shortlist" 50, as shown in FIG. 12. The shortlist 50 displays all items selected by the user. It is also possible for the user to select an entire playlist from a search column and drag that playlist into their shortlist field. When this is done, all tracks in the selected playlist will be listed in the shortlist column 50. Once items have been placed in the shortlist column 50, the user is able to reorder the listing of items and delete items where necessary.

Figure 13:
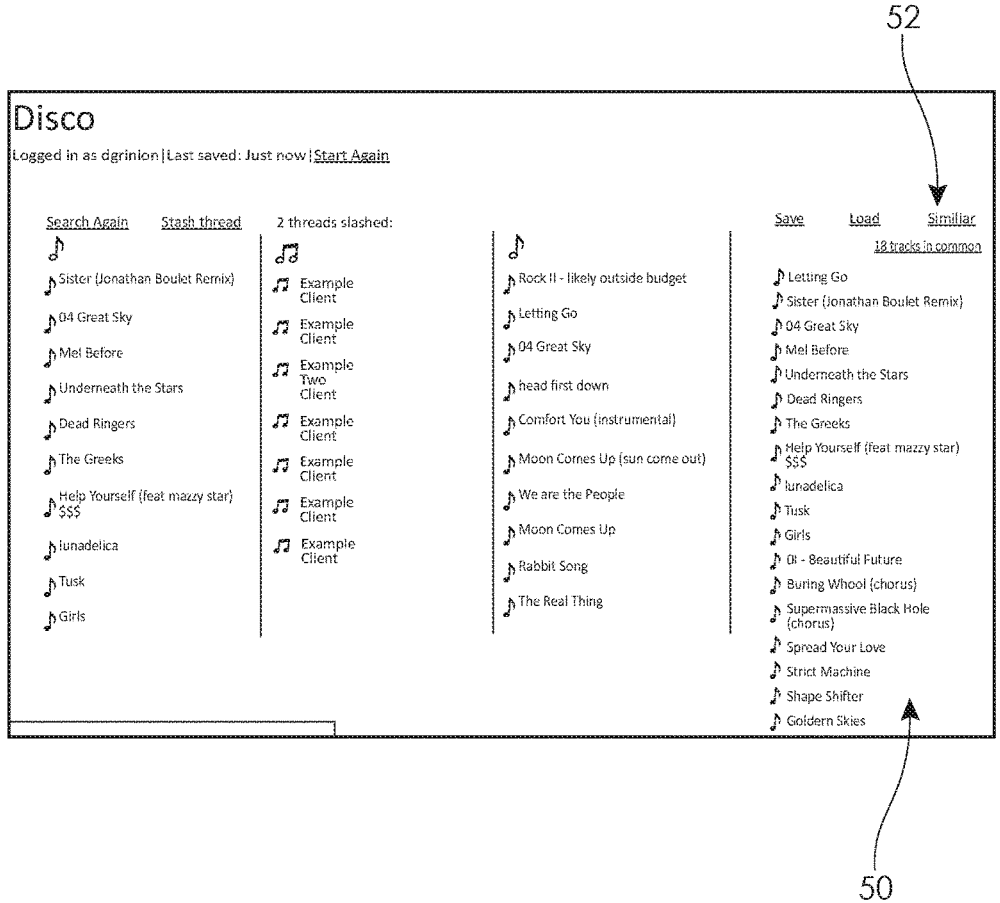

As shown in FIG. 13, as the shortlist is being compiled, the Disco interface is able to review the shortlist against all existing playlists to determine whether the shortlist is similar to any previously saved playlists. By selecting the "similar" drop down menu 52, the number of similar playlists are shown by way of their title together with an indication of the number of media files they have in common. This enables the user the ability to review the previous playlist if desired. Once a shortlist has been settled by the user, the shortlist can be simply saved as a playlist by selecting the save icon 54 and assigning a name to the playlist. Once saved, the playlist is stored in the database and can be downloaded into the user's iTunes or shared via email.

Figure 14:
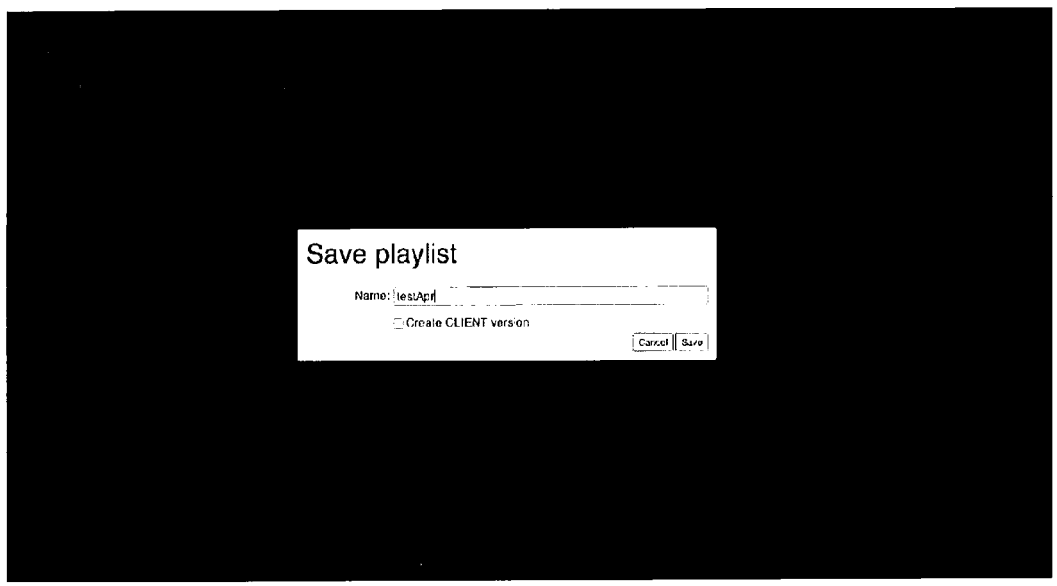

Any shortlist created in the above referenced manner can be converted into a playlist status and an automatic link can be sent to the person creating the list by email. Such a facility enables playlists for client or customer needs to be created remotely by way of the present engine so that the data of the list does not need to be pulled down into an "iTunes" or similar software facility before being converted into a final playlist status that enables it to be shared with a client or end customer, as depicted in FIG. 14.

Figure 15:
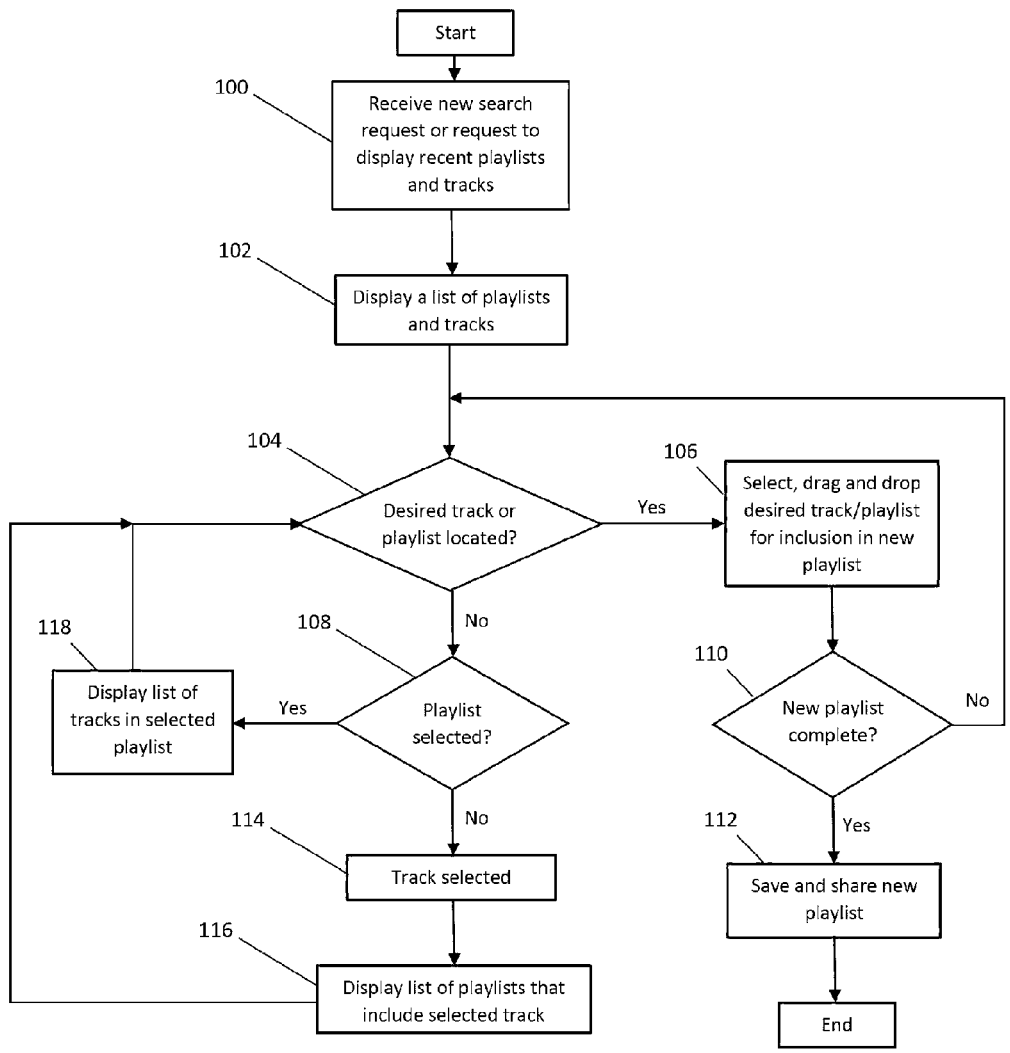
FIG. 15 is a functional flow diagram illustrating the operations of the software application described with reference to FIGS. 5-14.

A method of operating the Disco interface will now be explained with reference to FIG. 15.

At step 100, a new search request or a request to display recent playlists and tracks is received from a user operating the Disco interface (i.e. system front end). The search request can be based on one or more key words (i.e. identifiers) as previously discussed. The request is sent to a back end web server which supports the interface. In response to the search request, a search engine is activated to search and locate a search list of recent playlists, or playlists and tracks (or other media files) based on the key words.

At step 102, the web server sends the search list and associated display data generated from a data display module for display to the user via the interface. The search list is displayed on the left most column 42 (FIG. 8) on the users display device.

At query step 104, the user reviews the search list and determines whether a desired track or playlist has been located. If so, the method proceeds to step 106. If not, the method proceeds to step 108.

At step 106, the user selects the desired track or playlist for inclusion in a new playlist by using a 'drag and drop' user command. If a selected track is dragged and dropped into the new playlist, the software application adds the selected track into the new playlist. If a selected playlist is dragged and dropped into the new playlist, the interface sends a request to the web server and initiates a search via the search engine to locate all tracks in the selected playlist. The web server forwards information relating to all tracks of the playlist to the interface for inclusion in the new playlist.

At step 110, the user decides whether the new playlist is complete. If yes, the method proceeds to step 112. If not, the method proceeds to step 104.

At step 112, a user request to save the new playlist via the interface. The interface prompts the user for a name to identify the new playlist. Once received, the name and user related security information is sent via the interface to the web server to create and store the new playlist using contents of the tracks in the playlist. The user can then share the new playlist in a variety of ways, for example, via email, weblink or both.

At query step 108, the user decides to either select a playlist or a track from the search list generated at step 102. If a playlist is selected, the method proceeds to step 118. If not, the method proceeds to step 114.

At step 118, a playlist is selected from the search list generated at step 102. The interface sends a request to the web server for a full list of tracks in the selected playlist. The web server activates the search engine to locate the list of tracks, once located, the relevant information of the tracks is sent to the interface so that all tracks in the selected playlist is displayed to the user via the interface.

At step 114, a track is selected from the search list generated at step 102.

At step 116, in response to the selected track, a request is sent from the interface to the web server to activate the search engine to locate all playlists which include the selected track in step 114. Once all playlists are located, information relating to the playlists is sent via the web server to the interface so that all playlists including the selected track is displayed to the user.

The method then returns to query step 104 until all designed tracks or playlists are located to complete the new playlist.

The software application also permits the user to download any desirable track or playlist directly from a search column or new playlist column via the Disco interface. For example, the software application may generate a hyperlink for accessing the downloadable file. A user may also download a selected file directly (e.g. by using a 'right click' function of a mouse).

The software application further allows a track or playlist to be added to the new playlist from other libraries outside of the software application environment. For example, a user can simply add a new track or playlist from another library, such as the 'iTunes' library by a 'drag and drop' command. This would allow the user to add tracks/data files to the new playlist that do not form part of the library associated with the software application to be included in the new playlist.

It will be appreciated that the above system enables ongoing collaboration to be used to generate playlists for client requirements. With such a system of reviewing past playlists, should a user obtain a briefing from an advertising agency, they are able to review past playlists created for that agency to ensure that the same material is not supplied, and they can use previous playlists created for other purposes and client's as a basis for identifying and locating the most relevant tracks for the brief given.

It will be appreciated that the system and method for generating and storing play lists of media files of the present invention provides considerable commercial advantages to businesses that manage such services. The system provides a simple and effective means for not only providing data between offices but for backing up data and facilitating shared data resources and information. The system functions to utilise existing commercial software systems that for playing and creating media file libraries, whilst ensuring that security between files is maintained.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A system for facilitating the creation of playlists of media files including
   a database configured to store a plurality of playlists therein, each playlist including one or more media files, and each playlist and media file being identifiable by one or more identifiers;
   a search engine being operatively configured to search and locate
      one or more media files of a selected play list, wherein the selected play list can be selected from a list including playlists and media files identified based on the one or more identifiers,
      one or more playlists including a selected media file, wherein the selected media file can be selected from a list of media files and play lists identified based on the one or more identifiers; and
   a display module for generating display data to display search results of the search engine, wherein the display module is configured to generate display data for displaying
      a first list of playlists and media files in response to receiving one or more identifiers,
      a second list of playlists in response to a selected media file from the first list, wherein the selected media file forms part of each playlist in the second list, and
      a third list of media files in response to a selected playlist from the second list,
      wherein the selected play list includes the third list of media files
   or for displaying
      a first list of playlists and media files in response to receiving one or more identifiers,
      a second list of media files in response to a selected playlist from the first list, wherein the selected playlist includes the second list of media files, and
      a third list of playlists in response to a selected media file from the second list, wherein the selected media file forms part of each playlist in the second list.

2. The system as claimed in claim 1, wherein the display module is capable of displaying further lists of media files and playlists based on a selected media file or playlist from an immediately preceding list.

3. The system as claimed in claim 1, further including a display device for displaying data generated from the display module, wherein the display device displays the first, second and third list respectively from left to right with respect to a user facing a screen of the display device.

4. The system as claimed in claim 3, wherein each consecutive list is visibly displayed on the display device with an immediately preceding list.

5. The system according to claim 1, wherein the media files include any one or more of music files, video files and image files.

6. The system according to claim 1, further including a playlist module for creating a new playlist, wherein the new playlist includes one or more media files and/or play lists located by the search engine and wherein the system is configured to allow the new play list to be saved and contents of the media files of the new play list downloaded for offline access.

7. The system of claim 6, wherein the contents of the media files of the new play list can be shared via email.

8. The system according to claim 1, further including a playlist module for creating a new playlist, wherein the new playlist includes one or more media files and/or playlists selected from any one of the lists and wherein the system is configured to allow the new play list to be saved and contents of the media files of the new play list downloaded for offline access.

9. The system of claim 8, wherein the contents of the media files of the new playlist can be shared via email.

10. The system according to claim 1, further including
    a playlist transmission module, the playlist transmission module being configured to facilitate transmission of a playlist from a remote user to the server and/or a stored playlist from the server to the user, wherein, prior to transmission of the playlist, the playlist transmission module determines whether a media file is present at the server or remote user and only transmits media files that are not present at the server or remote user.

11. The system as claimed in claim 1, further including
    an interface for receiving one or more identifiers,
    the display module being configured for generating display data for displaying the search list via the interface.

12. The system as claimed in claim 1, further comprising:
    a server configured to receive and store the playlists of media files therein;
    one or more remote devices, each device comprising a processor including executable software capable of generating a playlist made up of one or more media files; and
    a playlist transmission module, the playlist transmission module being configured to interface with the software and the server to facilitate transmission of the generated playlist from said remote device to said server and/or a stored playlist from said server to said remote device, wherein, prior to transmission of said playlist, the playlist transmission module determines whether a media file is present at the server or remote user and only transmits media files that are not present at the server or remote user.

13. The system of claim 12, further including a file transfer interface, the interface being configured to allow a user to transfer a selected file between the server and a remote device via a drag and drop user command.

14. The system as claimed in claim 1, the system being configured to share files between multiple users across a network, wherein the system is configured to:
generate a list of files for review by at least one or more recipient users;
push said list of files to said one or more recipient users across said network;
determine whether the said one or more recipient users is in possession of one or more files in said list of files;
pull from a stored location only those files in the list of files that is not in the possession of said recipient user;
present to said recipient user a downloadable said list of files for review; and
deliver the files for review by the recipient through the recipient's preferred file playing software.

15. The system of claim 14, wherein the list of files includes one or more media files or playlists.

16. A method of creating playlists of media files, including
searching a database including a plurality of playlists, each playlist including one or more media files, wherein each playlist and media file is identifiable by one or more identifiers;
in response to a user selected playlist, locating one or more media files of the selected playlist, wherein the selected playlist is selected from a list including playlists and media files identified based on the one or more identifiers,
in response to a user selected media file, locating one or more playlists including the selected media file, wherein the selected media file is selected from a list of media files and playlists identified based on the one or more identifiers, and
generating display data using a display module and displaying
a first list of playlists and media files in response to receiving one or more identifiers,
a second list of playlists in response to the selected media file from the first list, wherein the selected media file forms part of each playlist in the second list, and
a third list of media files in response to a selected playlist from the second list, wherein the selected playlist includes the third list of media files,
or displaying
a first list of playlists and media files in response to receiving one or more identifiers,
a second list of media files in response to a selected playlist from the first list, wherein the selected playlist includes the second list of media files, and
a third list of playlists in response to a selected media file from the second list, wherein the selected media file forms part of each playlist in the second list.

17. The method of claim 16, further including
creating a new playlist based on the one or more located playlists and/or one or more located media files.

18. A method of creating a compilation of files, including
searching a database including a plurality of compilations, each compilation including one or more files, wherein each compilation and file is identifiable by one or more identifiers;
in response to a user selected compilation, locating one or more files of the selected compilation, wherein the selected compilation is selected from a list including compilations and files identified based on the one or more identifiers,
in response to a user selected file, locating one or more compilations including the selected file, wherein the selected file is selected from a list of compilations and files identified based on the one or more identifiers, and
generating display data using a display module and displaying
a first list of compilations and files in response to receiving one or more identifiers,
a second list of compilations in response to the selected file from the first list, wherein the selected file forms part of each compilation in the second list, and
a third list of files in response to a selected compilation from the second list, wherein the selected compilation includes the third list of files,
or displaying
a first list of compilations and files in response to receiving one or more identifiers,
a second list of files in response to a selected compilation from the first list, wherein the selected compilation includes the second list of files, and
a third list of compilations in response to a selected file from the second list, wherein the selected file forms part of each compilation in the second list.

* * * * *